United States Patent
Ain et al.

(10) Patent No.: US 7,327,692 B2
(45) Date of Patent: *Feb. 5, 2008

(54) SYSTEM AND METHOD FOR SELECTING FIBRE CHANNEL SWITCHED FABRIC FRAME PATHS

(75) Inventors: Jonathan Wade Ain, Tucson, AZ (US); Craig Anthony Klein, Tucson, AZ (US); Robert George Emberty, Tucson, AZ (US); Peter Connley Lancaster, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

This patent is subject to a terminal disclaimer.

(21) Appl. No.: 10/317,765

(22) Filed: Dec. 12, 2002

(65) Prior Publication Data

US 2004/0047294 A1 Mar. 11, 2004

Related U.S. Application Data

(63) Continuation-in-part of application No. 10/238,751, filed on Sep. 10, 2002.

(51) Int. Cl.
*H04L 12/26* (2006.01)
*H04L 12/66* (2006.01)
*H04L 12/56* (2006.01)
*H04J 3/16* (2006.01)
*G06F 15/173* (2006.01)
*G06F 15/16* (2006.01)

(52) U.S. Cl. .................. 370/252; 370/463; 370/468; 370/395.41; 709/223; 709/229

(58) Field of Classification Search ............... 370/252, 370/253, 468, 232, 233, 234, 235, 238, 254, 370/395.21, 400, 395.4, 395.41, 463, 230.1; 709/223, 224, 225, 226, 229

See application file for complete search history.

(56) References Cited

U.S. PATENT DOCUMENTS 5,502,719 A 3/1996 Grant et al.

(Continued)

FOREIGN PATENT DOCUMENTS

WO WO 01/43368 A1 6/2001

OTHER PUBLICATIONS

"Protocol for Isochronous Traffic over Fiber Channel Switching", IBM Technical Disclosure Bulletin, vol. 37, No. 06B, Jun. 1994, pp. 377-380.

"I/O Switched Network Using Packet Switches", IBM Technical Disclosure Bulletin, vol. 35, No. 4A, Sep. 1992, pp. 179-181.

*Primary Examiner*—King Y. Poon
*Assistant Examiner*—Peter L Cheng
(74) *Attorney, Agent, or Firm*—Scully, Scott, Murphy & Presser, P.C.

(57) ABSTRACT

A system and method for measuring data transmission activity through a port of a switch device interconnecting nodes of a storage area network, the port transmitting data as words of predetermined length, one data word indicating idle port activity. The method includes steps of: counting a number of transmitted words received from the port in a first counter device; and, for each word counted, comparing that word with a predetermined word indicating no (idle) port transmission activity. In response to the comparing, a number of matches are counted in a second counter device. In this manner, a ratio of a number of counted matches with a total amount of words counted indicates available bandwidth for transmitting additional data over that link. Preferably, this available bandwidth information is included in a link state record that the switch communicates to other switch devices interconnecting that link. Processing devices at the switches determine a link cost factor, based on the available bandwidth of that link and, in addition, the link speed, the cost factor being used to optimize path selection over links in the network according to a path routing algorithm.

8 Claims, 2 Drawing Sheets

U.S. PATENT DOCUMENTS

| | | |
|---|---|---|
| 5,519,695 A | 5/1996 | Purohit et al. |
| 5,528,584 A | 6/1996 | Grant et al. |
| 5,592,472 A | 1/1997 | Grant et al. |
| 5,784,372 A | 7/1998 | Faulds |
| 5,878,029 A * | 3/1999 | Hasegawa et al. ......... 370/236 |
| 6,016,306 A * | 1/2000 | Le Boudec et al. ........ 370/235 |
| 6,016,307 A * | 1/2000 | Kaplan et al. .............. 370/238 |
| 6,130,879 A | 10/2000 | Liu |
| 6,141,327 A | 10/2000 | Kalkunte et al. |
| 6,144,641 A * | 11/2000 | Kaplan et al. .............. 370/238 |
| 6,233,236 B1 * | 5/2001 | Nelson et al. .............. 370/359 |
| 6,370,119 B1 * | 4/2002 | Basso et al. ................ 370/252 |
| 6,687,651 B2 * | 2/2004 | Stewart ...................... 702/182 |
| 2002/0012340 A1 | 1/2002 | Kalkunte et al. |
| 2003/0016630 A1* | 1/2003 | Vega-Garcia et al. ....... 370/252 |
| 2004/0047291 A1* | 3/2004 | Ain et al. ................ 370/230.1 |

\* cited by examiner

SYSTEM AND METHOD FOR SELECTING FIBRE CHANNEL SWITCHED FABRIC FRAME PATHS

CROSS-REFERENCE TO RELATED APPLICATION

This application is a continuation-in-part application based upon and claiming the benefit of the filing of commonly-owned, co-pending U.S. patent application Ser. No. 10/238,751 filed Sep. 10, 2002 entitled "AVAILABLE BANDWIDTH DETECTOR FOR SAN SWITCH PORTS," the contents and disclosure of which are fully incorporated herein by reference.

BACKGROUND OF THE INVENTION

1. Field of the Invention

The present invention relates to fibre channel switched networks and particularly to a system and method for selecting frame paths in a fibre channel switched network that takes into account available bandwidth considerations.

2. Description of the Prior Art

FIG. 1 depicts generally a Storage Area Network (SAN) 10 which is a dedicated high performance network capable of moving data between heterogeneous servers 16a, 16b, ..., 16n and storage resources such as disk drives and arrays (RAIDS) 18 or tape storage devices and/or libraries 20. As shown in FIG. 1, a Local Area Network (LAN) 12 is provided which enables the sharing of data files among groups of user clients, such as desktop computers 14a, 14b, ..., 14n. The LAN 12 may comprise an Internet Protocol (IP) network such as Ethernet and provides client/server connectivity between the desktop client 14a, and SAN server devices 16a, 16b, ..., 16n using messaging communications protocols like TCP/IP. The SAN 10 includes a separate dedicated network, such as a Fiber Channel network 25, that preferably comprises a switched topology or "fabric" including fiber channel interconnect devices such as switches, 30, routers 22 and high speed serial links 26 interconnecting the servers 16a, 16b, ..., 16n to the storage subsystems 18, 20 for storage networking. As known, such a SAN architecture 10 advantageously minimizes any traffic conflicts and provides for increased scalability, availability, and file transfers over longer distances as compared to SANs of traditional messaging networks comprising bus architectures. The Fiber Channel based SAN, such as shown in FIG. 1, combines the high performance of an I/O channel and the advantages of a network (connectivity and distance of a network) using similar network technology components like routers 22, switches 30 and gateways (not shown). Thus, SAN products do not function like a server. Rather, the SAN product processes block I/O protocols, such as Fiber Channel Protocol (SCSI-FCP) or Fiber Connection (FICON), for some other system, e.g., a server.

As known, the fiber channel switching fabric 25 is organized into logical entities including ports, nodes and platforms. For instance, fiber channel "nodes" are physical devices, e.g., disk drive or disk arrays, workstations, storage devices, etc., that may be a source or destination of information to/from other nodes. Each node comprises one or more "ports" which are the hardware interfaces that connect all fiber channel devices to the topology via links, i.e., electrical or optical transmit fibers, e.g. cables of copper or optical fiber. Ports are designated and have different attributes depending upon the switch topology in which they are implemented, e.g., point-to-point, arbitrated loop, fabric.

In Fibre Channel networks comprising a switching fabric, such as shown in FIG. 1, switches 30 communicate to each other over switch-to-switch links via Expansion or "E"-ports. A part of each switch's function in the network is to generate a Link State Record ("LSR") 99 that completely describes the connectivity of a switch to all switches to which it is directly attached. The LSR 99 generated at a switch is communicated to all other switches connected to that switch to provide the switch fabric with information such as the status of each switch port. The ANSI Fibre Channel Switch Fabric-3(FC-SW-3) rev 6.01 (NCITS) working draft proposed American National Standard for Information Technology (Jun. 1, 2002), incorporated herein by reference, describes in greater detail the composition of the LSR that is communicated. For instance, as described in the proposed ANSI Fibre Channel Switch Fabric-3 standard, basic information included in the LSR includes, but is not limited to: whether a particular port is up, the speed of a link connected to the port, e.g., 1 Gbit/sec, 2 Gbit/sec, etc., the LSR age, an options field, a length, checksum bytes, etc.

Typically, the LSR header is 24 bytes having a configuration as follows:

| | |
|---|---|
| byte 1 | Type |
| byte 2 | Reserved |
| bytes 3-4 | LSR Age |
| bytes 5-8 | Options |
| bytes 9-12 | Link State ID |
| bytes 13-16 | Advertising Domain ID |
| bytes 17-20 | Link State Incarnation |
| bytes 21-22 | Checksum |
| bytes 23-24 | LSR Length |

From this information, whenever a switch comes up in the Fibre Channel network, it may then look at the speed of the link and the number of hops to determine the cost of a particular path, the proposed cost being a combination of the speed of the links versus the number of switches it goes to. From this information, a shortest path may be calculated using a well known algorithm, e.g., a Fabric Shortest Path First (FSPF) path selection protocol. A more detailed description of the FSPF algorithm may be found at the T11 standards website at section (8) of the D Switch Fabric-2 specification, revision 5.4, incorporated by reference herein.

Within a Storage Area Network (SAN) a path selection process for routing frames only considers the link cost in the fibre channel switched fabric to determine the best path for routing frames through fibre switches. The link cost is a measurement that is calculated by the following formula:

$$\text{Link Cost} = S*(1.0625e12/\text{Baud Rate})$$

By default, S is an administrative value, typically set to one. The number 1.0625e12 is exemplary and for purposes of discussion is equal to 1000 times 1.0625$e9$ (which represents a 1 Gb/s link speed). Thus, for example, when the Link Cost is calculated for a 1.0625 Gb/s Fibre Channel Link, this calculation yields (with S set to 1.0): 1.0* (1.0625e12/1.0625e9)=1000. It should be understood that the 1.0625e12 number is configurable and may change in accordance with link speed. Currently, link cost only considers link speed (i.e., the Baud rate). However, while link speed is one important measurement to consider in best frame path selection, there are several other factors that may be considered as well. One of these additional factors would be the current congestion or amount of available bandwidth for each link along each available path through fabric.

It would be highly desirable to provide a frame path selection system and method that takes into account available bandwidth of each port (link) and the link cost, in real time.

SUMMARY OF THE INVENTION

It is an object of the present invention to provide a system and method for determining an amount of available bandwidth at each switch port, in real-time, and utilizing this available bandwidth information in a manner to provide for more accurate path selection and frame routing algorithms.

It is a further object of the present invention to provide a system and method for determining an amount of available bandwidth at each switch port, in real-time, and inserting this available bandwidth information in the Link State Record for propagation to all other switches in the fabric, so that it each switch will know the available bandwidth for all ports within the network to optimize routing decisions.

It is another object of the present invention to provide a system and method for determining an amount of available bandwidth at each switch port, in real-time, and inserting this available bandwidth information in the Link State Record and utilizing this added bandwidth information to influence frame routing decisions.

The invention particularly comprises adding a definition of a value for placement in a defined byte field in the Link State Record (LSR) that would reflect the amount of bandwidth available for each link. Using this value, fibre channel network switches may take not only link speed into consideration but also consider current traffic and congestion on the associated link. Thus, the percentage of bandwidth available or current congestion found on the fibre link may be factored in along with the link speed.

Thus, according to the principles of the invention, there is provided a system and method for measuring data transmission activity through a port of a switch device interconnecting nodes of a storage area network, the port transmitting data as words of predetermined length, one data word indicating idle port activity. The method includes steps of: counting a number of transmitted words received from the port in a first counter device; and, for each word counted, comparing that word with a predetermined word indicating no (idle) port transmission activity. In response to the comparing, a number of matches are counted in a second counter device. In this manner, a ratio of a number of counted matches with a total amount of words counted indicates available bandwidth for transmitting additional data over that link. Preferably, this available bandwidth information is included in a Link State Record that the switch communicates to other switch devices interconnecting that link. Processing devices at the switches determine a link cost factor, based on the available bandwidth of that link and, in addition, the link speed, the cost factor being used to optimize path selection over links in the network according to a path routing algorithm.

It is understood that the system and method of the present invention may be implemented at switch nodes in many types of SANs, including Gigabit Ethernet, INFINI-BAND®, and iSCSI. Furthermore, the present invention may be implemented for determining available bandwidth for other types of Fiber Channel node ports. That is, other ports interconnected by links in a switch fabric may benefit from the system and method.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
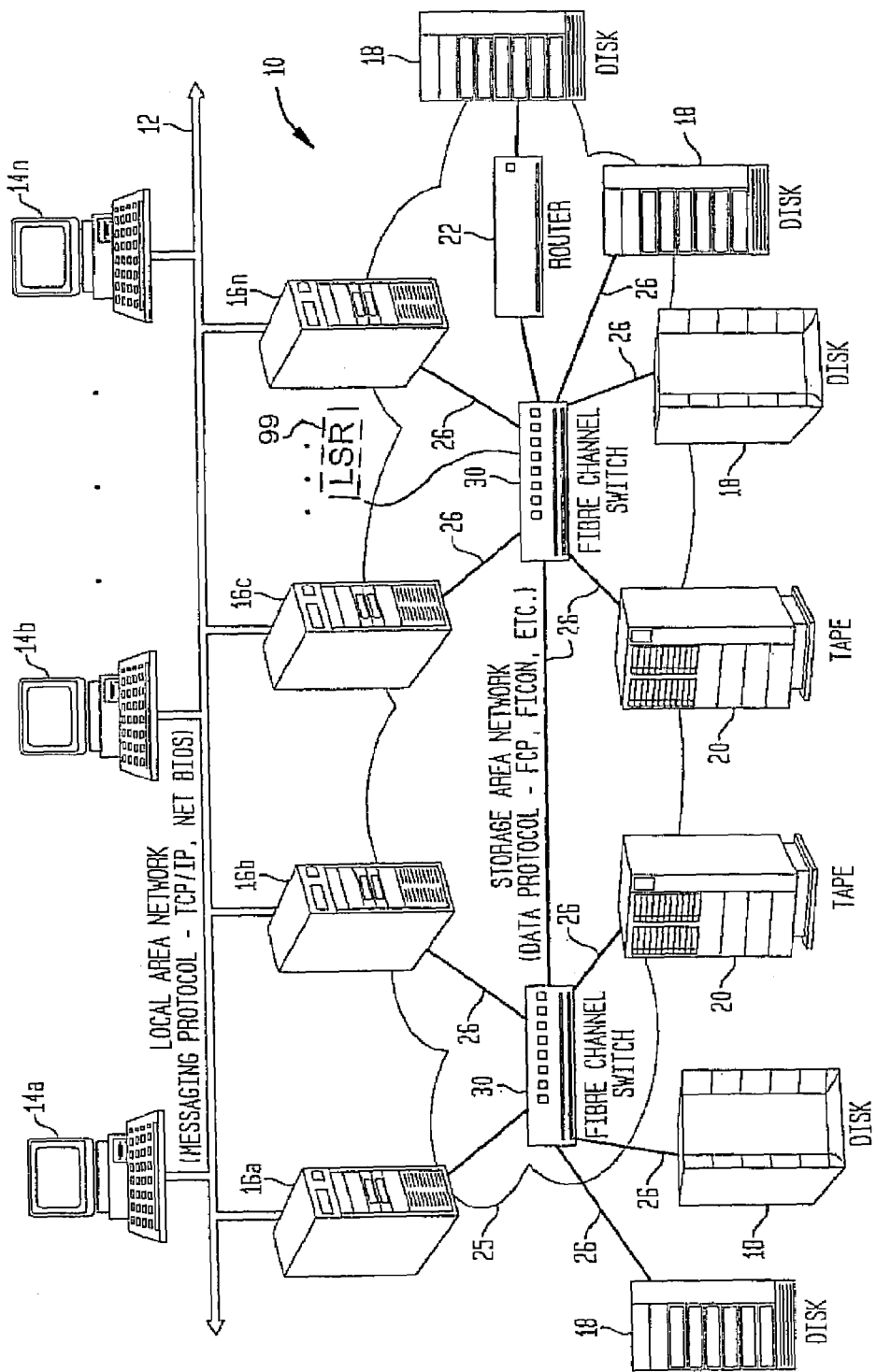
FIG. 1 depicts generally a Storage Area Network (SAN) 10 including a dedicated high performance network capable of moving data between heterogeneous servers and storage resources such as disk drives and arrays (RAIDS) or tape storage devices and/or libraries; and, FIG. 2 illustrates the state machine for measuring the activity through the various ports of switches in a switch fabric of a Fibre Channel Network.
Figure 2:
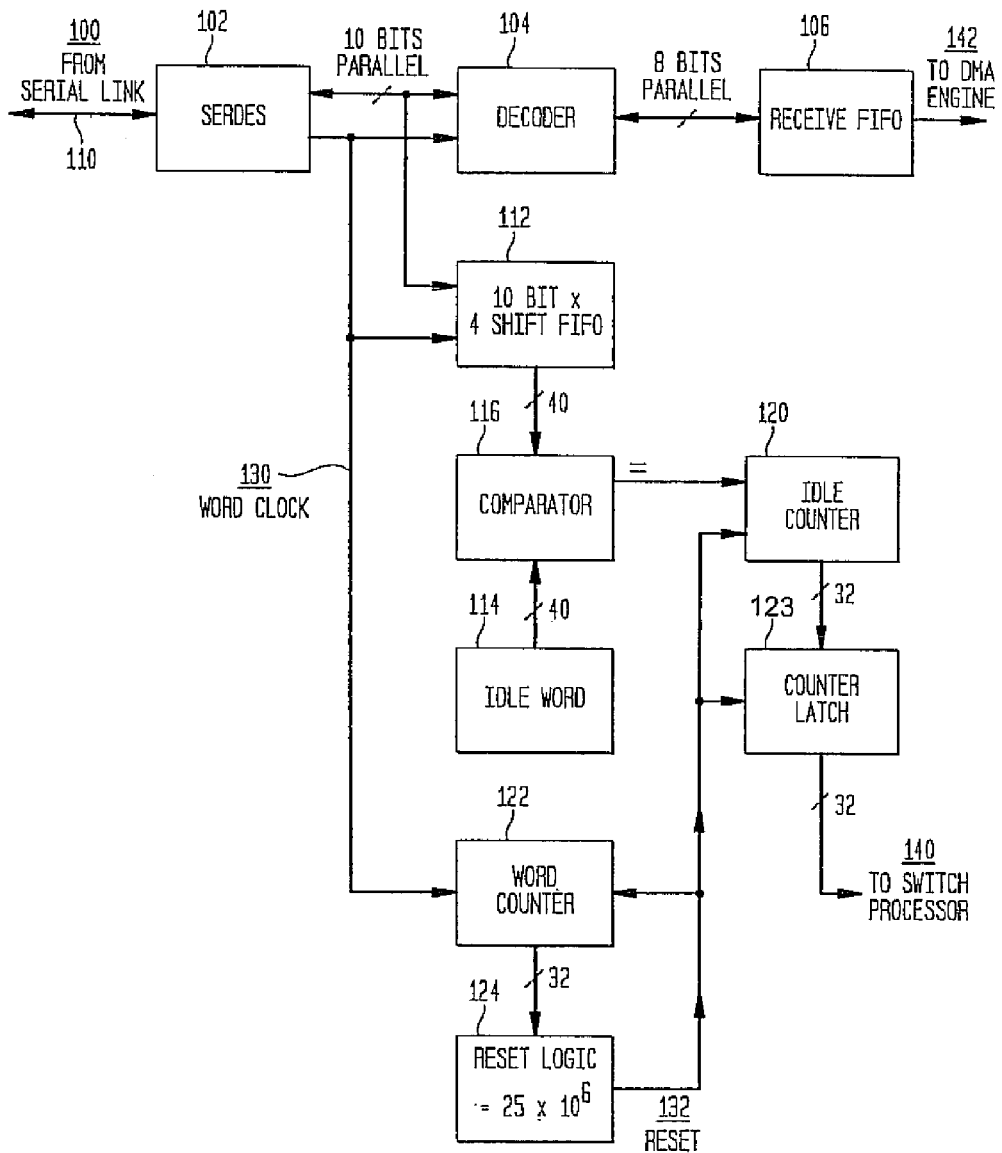

The fibre bandwidth available at a port is measured according to a technique that includes counting the number of idles state words found at any one time on the fibre link. Details concerning this measurement technique is disclosed in commonly-owned, co-pending U.S. patent application Ser. No. 10/238,751 filed Sep. 10, 2002 and entitled "AVAILABLE BANDWIDTH DETECTOR FOR SAN SWITCH PORTS," the whole content and disclosure of which is fully incorporated herein by re Briefly, in view of FIG. 2, there is depicted a novel state machine for measuring the activity through the various ports of the switches in a switch fabric of a Storage Area Network according to the present invention. As shown in FIG. 2, a data stream 110 communicated from a node is received at a switch port (not shown) along link 100. The data stream is received and processed by the SERDES module 102 which provides link control for a fiber channel port. The SERDES deserializer receives the serial stream and generates 10-bit wide data bytes (encoded characters), and a word clock 130, indicating a word is available. Generally, as part of the receive process, the deserialized data enters a decoder 104, e.g., an 8$b$/10$b$ decoder, where the data is then converted to 8-bit data in parallel with parity. The data then enters an elastic FIFO buffer 106 where it is accessible via Direct Memory Access DMA engine 142.

The received 10-bit wide data byte is tapped off the output of the SERDES module 102 and clocked into a 10-bit wide x 4 deep shift FIFO register 112 with parallel access to accumulate a transmitted ordered set comprising 40 bits i.e., four ten-bit words. The resulting 40-bit data word is compared with the "IDLE" ordered set, which is a special ordered set (40-bit word) specified by the Fiber Channel protocol to be transmitted when a port (of a node) has no valid data to send. Preferably, the special 40-bit IDLE word is hard-wired in a register 114 or equivalent data storage structure. When the FIFO register 112 has received four characters in succession (i.e., the 40 bit word), a comparator device 116 is triggered compares the received ordered set to determine if the received ordered set corresponds to the IDLE ordered set (word). Each time an IDLE word is detected by comparator 116, a comparator output signal is generated to increment a counter device 120 for counting IDLE words. Simultaneously with the detection and counting of received IDLE words, a word counter device 122 is provided to count the total number of words received. Particularly, as shown in FIG. 2, the word clock 130 that clocks the received 10-bit wide data words into the shift FIFO register 112, is additionally implemented to count the total number of received words in the word counter device 122. Reset logic circuit 124 is provided to generate a reset signal 132 when the counter device 122 has counted a pre-determined number of words. The reset logic word count is configurable depending upon the type of network implemented, and for purposes of explanation, maybe set to reach a value 25×10$^6$, for example. The value of 25×10$^6$ words, in the example system illustrated in FIG. 2, would correspond to a link 100 data rate of 1.0 Gbit/sec as there are 4 characters/word and 10 bits/character (according to the 8$b$/10$b$ encoding scheme) which is multiplied by 25×10$^6$ words total number received and counted. Thus, when the amount of words received (and counted) has reached the value specified by the reset logic circuit 124 (e.g., 25×10$^6$), the reset signal 132 is generated to latch the value of the IDLE counter register 120 by a counter latch device 123. Additionally, at that moment, the reset signal 132 resets the IDLE counter 120 and word counter 122, so that continuous bandwidth activity at a switch port may be ascertained. Preferably, the latched IDLE counter value is communicated to a processor device e.g., provided in the switch, via a bus 140. In this manner, the switch processor may thus compute a percentage comprising a ratio of the number of IDLE ordered sets (words) received for a fixed number of transmission words (e.g., 25×10$^6$), which translates into available bandwidth.

Thus, in one embodiment, as the fibre link bandwidth available is measured by counting the number of idles found at any one time in the fibre link, this measurement value may be inserted in the Link State Record (LSR), for example, in the defined Link Options field within the LSR which field is large enough to count up to 4 Gbyte of idles on each link. Presently, this Link Options field has no options defined, and is set to 0x00 0x00 0x00 0x00.

In an embodiment that avoids the use of the entire Link Options field, the unused bandwidth may be computed as a percentage of the total bandwidth of the associated link. In this manner, the switch processor device may compute a percentage comprising a ratio of the number of IDLE ordered sets (words) received for a fixed number of transmission words (e.g., 25×10$^6$), which translates into available bandwidth, referred to herein as a variable w'. Preferably, the available bandwidth w' is computed for each link subsection and may comprise a one byte number having values 1-255, for example.

Once the amount of available bandwidth w' is determined, this value is inserted in the Link State Record (LSR), for example, in the defined Reserved field (one byte) within the LSR, or, may be provided in a new defined byte field provided in the LSR. For example, this new field may reside in byte 0x45 of the FSPF (Fabric Shortest Path First) Information Unit, i.e. word 3, byte 1 of the link descriptor. Accordingly, based on the available bandwidth information provided in the LSR, the bandwidth of any selected path is determined to be equal to the bandwidth of the link having the least available bandwidth within that path.

Link Cost may then be computed using this additional factor, and thus to some degree, reflect actual link usage. Thus, with the available bandwidth information w' (a number from 1 to 255, for example), the used bandwidth, w, of a link may be computed as follows:

$$w = 1 - w'/255$$

Link Cost for each link can then be calculated using the current administratively defined factor S, the baud rate and the percentage of used bandwidth:

$$\text{Link Cost} = S * w * (1.0625e12/\text{Baud rate})$$

In an exemplary embodiment, the switch that owns the LSR record will transmit an update of the LSR including the available bandwidth information for each LSR Refresh Time-Out Value (L_R_TOV), which is 30 minutes by default. In this way, each additional switch will have the current Link Cost as well as the amount of available bandwidth for each link that it is attached to select the optimum paths for subsequent frames. This method would result in better performance and control over the Storage Area Network (SAN) preventing bottlenecks due to over used links and paths from the switch.

It is understood that the system and method of the present invention may be implemented at switch nodes in many types of SANs, including Gigabit Ethernet, INFINIBAND®, and iSCSI. Furthermore, the present invention may be implemented for determining available bandwidth for other types of Fiber Channel node ports. That is, other ports interconnected by links in a switch fabric may benefit from the system and method.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A method for optimizing data transmission activity through ports of a switch device interconnecting nodes of a storage area network, the port transmitting data as words of predetermined length, one data word indicating idle port activity, said method comprising:
   a) counting a number of transmitted words received from said port in a first counter device; and,
   b) for each word counted, comparing that word with a predetermined word indicating idle port transmission activity; and
   c) counting a number of matches in a second counter device in response to said comparing,
   d) computing a ratio of a number of counted matches with said fixed amount of words counted, said ratio indicating available bandwidth for transmitting additional data through said port; and,
   e) communicating said available bandwidth information to other switch devices to thereby optimize transmission of data through ports interconnecting said switch devices.

2. The method as claimed in claim 1, wherein said network is a fiber channel network comprising switch devices interconnecting nodes by communication links, said links carrying data in serial form between switch devices in a switch fabric of said fiber channel network, said method further comprising the step of:
   f) computing a cost of transmission over a link interconnecting said port in the network as a basis for determining transmission of data over a path including said interconnected link,
   wherein said link cost considers a speed of said link and said available bandwidth information.

3. The method as claimed in claim 2, wherein said data words are communicated over said link in serial form and received as a serial stream, said counting step a) further comprising the steps of:

synchronizing receipt of said data words from said serial stream;

generating a clock signal indicating receipt of a transmitted word in said serial stream; and, de-serializing said data stream and converting each received word to a parallel format.

4. The method as claimed in claim 2, further comprising the step of:

calculating said link cost as:

Link Cost=S*(n/Baud Rate)

with S and n being pre-defined values, and Baud Rate indicating said link speed.

5. The method as claimed in claim 4, wherein said ratio indicating available bandwidth for transmitting additional data through said port is defined as a variable w' of byte length, said method including the step of calculating a used bandwidth, w, of a link according to:

w=1−w'/255.

6. The method as claimed in claim 5, further including the step of calculating link cost according to:

Link Cost=S*w* (n/baud rate)

with S and n being pre-defined values, and Baud Rate indicating said link speed.

7. The method as claimed in claim 5, wherein prior to said communicating step e), the step of: generating a Link State Record (LSR) for communicating said available bandwidth information to other switch devices in said network, said available bandwidth information inserted in said LSR as said byte w'.

8. The method as claimed in claim 7, wherein, for a switch device, the step of implementing a Fabric Shortest Path First algorithm for determining data routing through said network based on link speed and said available bandwidth information provided in said LSR.

* * * * *